Sept. 28, 1965   J. EVANICSKO, JR   3,209,298
ARRANGEMENT FOR CONTROLLING CIRCUIT CONDUCTIVITY
Filed Oct. 31, 1961   2 Sheets-Sheet 1
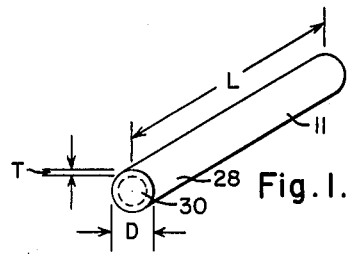
Fig. 1.
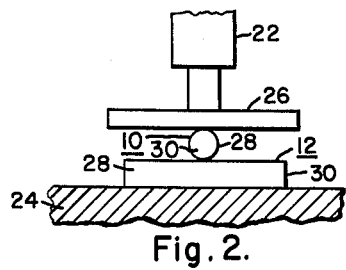
Fig. 2.
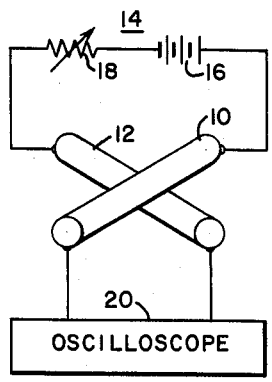
Fig. 3.
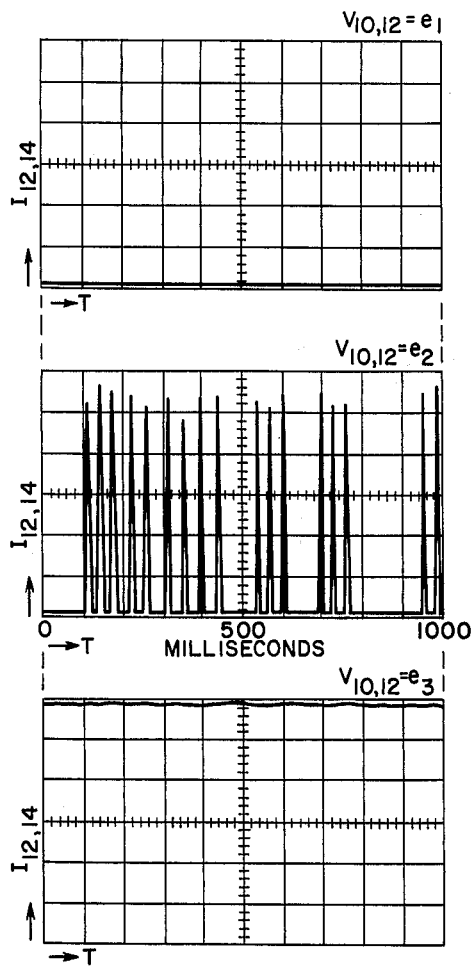
Fig. 4.
WITNESSES:
Bernard R. Gieguer
Edward F. Possessky
INVENTOR
Joseph Evanicsko, Jr.
BY 
ATTORNEY Sept. 28, 1965   J. EVANICSKO, JR   3,209,298
ARRANGEMENT FOR CONTROLLING CIRCUIT CONDUCTIVITY
Filed Oct. 31, 1961   2 Sheets-Sheet 2
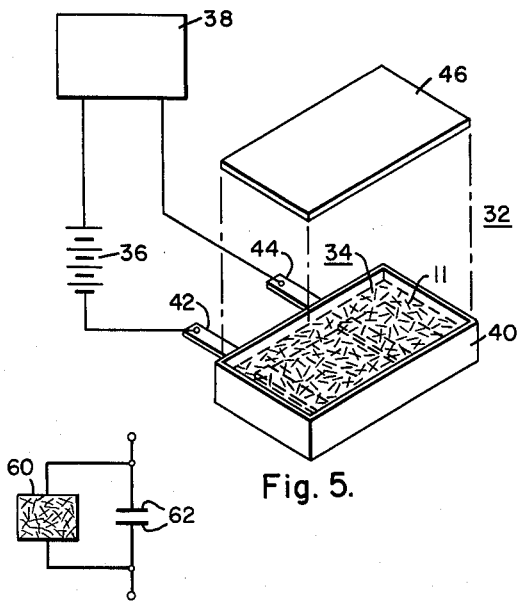
Fig. 5.
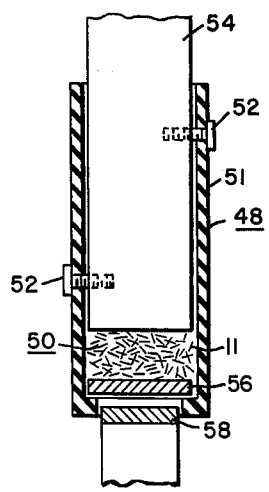
Fig. 6.
Fig. 8
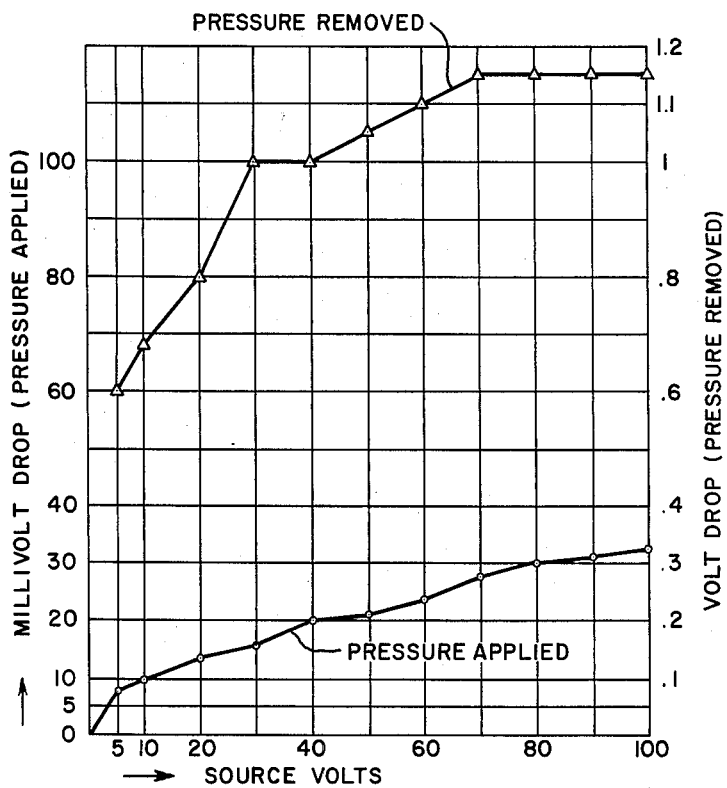
Fig. 7.

United States Patent Office 3,209,298
Patented Sept. 28, 1965

3,209,298
ARRANGEMENT FOR CONTROLLING
CIRCUIT CONDUCTIVITY
Joseph Evanicsko, Jr., Jeannette, Pa., assignor to Westinghouse Electric Corporation, East Pittsburgh, Pa., a corporation of Pennsylvania
Filed Oct. 31, 1961, Ser. No. 149,088
5 Claims. (Cl. 338—99)

The present invention relates to arrangements for controlling conductivity in an electric circuit either between fully conductive and fully nonconductive circuit conditions or between conductive and resistive circuit conditions.

One of the more fundamental functions commonly provided in an electric circuit is that of providing control of conductivity within the circuit. This includes both controlling circuit continuity or switching the circuit between conductive and non-conductive conditions and providing intermediate ranges of variance in conductivity. Numerous common examples exist for each of these. With regard to the first, for example, there is the operation provided by an ordinary mechanical switch in controlling the transmittal of electrical power. As an example of the second, there is the operational effect provided by a resistive element electrically insertable into a series current path if damping is required when the path is closed or interrupted.

This invention encompasses devices operable to provide at least either of the functions just exemplified. The structure which may be used to form such devices operates on the basis of fundamental phenomena presently ascertained with reasonable certainty. Therefore, the explanatory portions of the ensuing description are presented in the interest of clarification and not as a limitation upon the invention.

In its broadest structural context, the invention comprises a mass of elements of given conductive and other physical properties. The mass is normally nonconductive over a given range of applied voltage yet it can be activated to a conductive state by means of applied pressure or by other means as will become more evident hereafter. When the mass is then subjected to inherent resilient forces or to gravitational or other externally applied forces, it exhibits a different level of conductivity or again becomes substantially nonconductive. The physical arrangement of the mass relative to other circuit elements is determinative of the variance in conductivity that can be obtained.

Thus, it is an object of the invention to provide a novel arrangement for controlling the conductivity of an electric circuit.

It is another object of the invention to provide a novel arrangement for switching an electric circuit between conductive and nonconductive conditions.

An additional object of the invention is to provide a novel circuit controlling arrangement including a compressible mass of elements provided between two terminals for switching the circuit between conductive and nonconductive conditions.

These and other objects of the invention will become more apparent upon consideration of the following detailed description along with the attached drawings, in which:

FIGURE 1 is an isometric view of a conductive fiber which can be used in accordance with the principles of the invention;

FIG. 2 is a view showing a pair of crossed elements or fibers under test conditions;

FIG. 3 is a schematic view showing the circuitry used to test the fibers shown in FIGURE 2;

FIG. 4 graphically portrays test results for the circuitry shown in FIG. 3;

FIG. 5 shows isometrically an embodiment of the invention in which a mass of elements or fibers is used to provide a switching function in a schematically illustrated circuit;

FIG. 6 is a partial elevational and partially sectioned view of another embodiment of the invention in which a mass of elements or fibers is used to provide a damping effect after closing or interruption of a circuit is initiated;

FIG. 7 graphically illustrates test results pertaining to the arrangement of FIG. 6; and, FIG. 8 is a schematic view of still another embodiment of the invention.

The specific description will now be set forth to illustrate the broad principles of the invention. It has been determined that when a pair of elements 10 and 12, as shown in FIG. 3, of given conductive properties, are engaged with each other the current through the elements 10 and 12 is a function of several variants, noteworthily the pressure producing the engagement and the voltage applied across the elements 10 and 12. The material from which the elements 10 and 12 are formed is also a significant factor because some degree of conductivity is an essential. For example, metallic materials such as tungsten, copper, aluminum, nickel, nichrome and stainless steel, are suitable for use in forming the elements 10 and 12. The criteria, such as desired resiliency and hardness and desired electrical operation, which can be used for selecting this material will become more apparent as this description continues. Other parameters also have relation to the denoted current function. Thus, the temperature of the elements 10 and 12, or their engaging portions, is significant. In addition, the geometry of individual elements, as well as that of the mass formed from a plurality of elements, is of importance in determination of the current function. In this instance, the structural form of the elements 10 and 12 is shown to be fibrous or wire-like only because this form is commercially common. Thus, elements of other geometric forms expectedly are at least suitable for use.

More specifically, test results have been obtained to provide empirical evidence of the electrically operative nature of the elements or fibers 10 and 12 when placed or crossed in engagement, for example as shown in FIGS. 2 and 3. The fibers 10 and 12 are included in a test circuit 14 in which a battery 16 is serially connected with a variable resistor 18 and the fibers 10 and 12. In instrument, such as an oscilloscope 20, is connected across the fibers 10 and 12 to provide a visual indication of the wave form of any current through the fibers 10 and 12.

To obtain variance in the pressure producing the engagement of the fibers 10 and 12, a micrometer 22 is employed. The fiber 12 is suitably supported upon a fixed member 24 and the fiber 10 is placed above and in crossed relation wtih the fiber 12. The micrometer 22 is also suitably supported and an arm 26 of this instrument is placed over the fiber 10. Turning motion of the arm 26 results in its upward or downward displacement thereby varying the pressure which produces engagement of the fibers 10 and 12.

For a given setting of the micrometer 22, voltage across the fibers 10 and 12 is varied through the use of the variable resistor 18. As shown in the upper portion of FIG. 4, there is little or no current through the fibers 10 and 12 for a given low voltage $e_1$ applied across the fibers 10 and 12. When the voltage across the fibers 10 and 12 is increased to a higher voltage $e_2$, as observed in the middle portion of FIG. 4, a condition of fritting occurs for reasons to be considered subsequently. A further increase in the applied voltage to a value $e_3$ results in full conduction through the fibers 10 and 12.

Metallurgically and electrically, it is theorized that this operation can be explained on the basis of the presence of an insulative coating or an oxide film 28 (FIG. 1) which covers a representative fiber 11 in the same manner as it covers each of the fibers 10 and 12. With little or no external engagement pressure applied to the fibers 10 and 12, the respective oxide films 28 are sufficiently insulative to provide a substantial dielectric barrier against current through these fibers. With increasing engagement pressure, conductivity increases because of increasing proximity between separate conductive cores 30 of the fibers 10 and 12. It is to be noted that in the case of a fiber comprising a material such as tungsten or stainless steel or aluminum, the oxide film 28 is substantially continuous so as to be impervious to further oxygenic penetration, and therefore penetration of the cores 30 through the films 28 is probably necessary to establish full conduction.

The test results obtained with one setting of the micrometer 22 have already been described. It follows that a set of conductivity curves can, if desired, be obtained for respective settings of the micrometer 22 so as to provide a locus curve giving the voltage at which full conduction occurs through the fibers 10 and 12 as a function of applied pressure.

As indicated previously, the geometry of the elements or fibers 10 and 12 has some relation to their electrical operation. The length L of the fibers 10 and 12 can be important, as will be described later, when a plurality of fibers are randomly enmassed to provide the function of conductivity control. The thickness T of the oxide film 28 is relevant both to the pressure and voltage necessary to establish conduction. Further, the importance of the cross-dimension or diameter D of the fibers 10 and 12 can best be realized by consideration of the extreme case where D is so large that the weight of the fiber 10 is then sufficient to establish conduction through itself and the fiber 12 without the application of external pressure or by consideration of the opposite extreme case where D is so small as to make it impracticable to form or use the fibers 10 and 12.

The fritting described in connection with the middle portion of FIG. 4 is a condition of instability between conductive and non-conductive conditions. A rigorous analysis of the physics of the fritting condition is not presently available, but generally it may be understood in cybernetic terms as being a condition in which insufficient mechanical and electric energy is transmitted to the fibers 10 and 12 to establish re-generative operating conditions. Thus, when full conduction does occur, it has been determined that microscopic welds develop across the conductive junction of the fibers 10 and 12. Nonconductivity is reestablished through a breakage of the welds. In the fritting condition, therefore, it appears that the conduction which does occur is insufficient to stimulate, on a re-generative basis, microscopic welding which would operate to establish full conduction.

In FIG. 5, there is illustrated a device 32 which includes a mass 34 of randomly positioned fibers 11 and which is connected in serial relation with a battery 36 and a load device, such as a lamp 38. The device 32 includes a box 40 at the bottom of which a pair of spaced power terminals 42 and 44 are provided. The fibers 11 are enmassed above and between the terminals 42 and 44. A pressure plate 46, which in this instance is preferably made of any common rigid insulative material, is insertable into the box 40 for compressing the fibers 11.

When the pressure plate 46 is placed into the box 40 and pressed, preferably uniformly, with sufficient force against the mass 34, full conduction between the terminals 42 and 44 and through the mass 34 is obtained to energize the lamp 38. Electrically, a plurality of current paths through the mass 34 are established by a multitude of conductive relations established between various pairs of fibers 11 in response to pressure from the plate 46 and voltage from the battery 36. Uniformly applied pressure on the plate 46 is preferred in the device 32 for the reason that conductive engagements of the fibers 11 within the mass 34 must be established along the length of the path between the terminals 42 and 44 which lies in a solid plane coplanar with the solid plane of the pressure plate 46. Since the conductive paths are so numerous, the fact that the material (such as tungsten) from which the fibers 11 are formed is characterized with relatively high resistivity has little impeding effect upon the total current.

Upon release of the pressure plate 46, current continues to flow because of the stability in conduction provided by numerous microscopic welds among the fibers 11. With separating forces being imposed by suitable means upon the fibers 11 in the mass 34, the microscopic welds are broken, if the material of the fibers 11 is suitably hard and perhaps resilient, and reoxidation of all of the separated fibers 11 occurs over areas of the fiber cores 30 which formerly had been welded. In connection with the selection of a material for the fibers 11, the latter desirably are made of a relatively hard material which is not brittle or readily breakable and which is resilient. In some instances, a stiff material without brittleness may be usable, but it is desirable to avoid using any material which has a tendency to take a permanent set.

In this instance, the fiber separating forces can be obtained through relatively slight agitating motion of the box 40. Thus, with the use of means, such as a bar across the open side of the box 40, for retaining the plate 46 in the box 40 and means, such as ordinary coil springs, for resiliently holding the plate 46 in a direction outwardly of the box 40, and with the box 40 mounted for slight agitating motion, the device 32 is provided in functional form as a switch.

As now theorized, reoxidation of the individual fibers 11 subsequent to their separation re-establishes nonconductive conditions and is probably enhanced by numerous small arcing currents which accompany the separating action. In this connection, it is also noteworthy that the division of what would ordinarily be a single opening or closing arc into numerous small arcs is advantageous from the point of view of operating life. Other physical switching arrangements can be provided in accordance with the broad principles of the invention. For an example, reference is to be made to a copending application of J. Evanicsko, Jr., E. H. Halpern and C. Deibel, entitled "Switching Device," filed on October 31, 1961, now issued as U.S. Patent 3,125,739 and assigned to the present assignee.

Thus, the device 32 provides the function of conductivity control in the form of switching action. In one specific experiment in which the fibers 11 were cut from tungsten wire .005 inch in diameter, an ammeter showed a current of 300 milliamperes when the device 32 was in its conductive state, and the ammeter showed no reading when the device 32 was in its nonconductive state. With the terminals 42 and 44 spaced about three inches apart, a 45 volt source was acceptably controlled while with the terminals 40 and 42 five inches apart a 110 volt source was acceptably controlled.

A great variety of switching characteristics can be obtained by varying the various design parameters of the device 32. These include the spacing and positioning of the terminals 42 and 44, the size of the mass 34 and the density and geometry of the individual fibers 11 and the material from which the fibers 11 are formed. It is to be noted that the length L of the fibers 11 is preferably to be less than the spacing between the terminals 42 and 44 or other employed terminals. Otherwise, the risk of having a continuous conductive path between these terminals is encountered.

In FIG. 6 there is shown another embodiment of the invention comprising an interrupting device or a butt type circuit breaker 48 in which a mass 50 of elements or fibers 11 is used to control conductivity by providing a damping effect during circuit interrupting or opening and closing operations. The interrupting device 48 includes a supporting tube 51 which is attached by fasteners 52 to a bus bar 54. Adjacent one end of the supporting tube 51 there is located a disc-type contact 56 which is positioned for compressing movement against the mass 50. A movable contact 58 is suitably positioned for controlled movement toward and away from the disc-type contact 56.

During closing action of the contact means or contacts 56 and 58, the mass 50 first becomes sufficiently pressurized to become conductive and then provides varying degrees of current damping during its further compression until it is so far compressed as to behave substantially as a conductor. During opening movement of the contact means, the contact 56 is withdrawn from the mass 50 by gravitational or other external forces when the movable contact 58 is separated from the contact 56. The mass 50 then tends to expand as a result of its own springiness and in so doing increasingly impedes current flowing serially from the bus bar 54 to the movable contact 58. Thus, the resulting damping effect serves to suppress current arcs between the contacts 56 and 58.

In FIG. 7 there are shown test results representative of the electrical behavior of the mass 50 in the device 48. The data for the curves shown in FIG. 7 were obtained through the use of a device identical to the device 32. In this experiment, the pressure plate 46 weighed seven pounds and was brought to rest upon the mass 34. The lower curve of FIG. 7 pertains to this experimental condition. It is noted that with 100 volts used in the test circuit the drop across the fibrous mass 34 was approximately 31 millivolts. When the pressure plate 46 was removed, the voltage drop increased to 1.15 volts. The results for other values of circuit voltage can be ascertained by comparing the two curves shown in FIG. 7. (Agitation of the mass 34 produces the switching behavior previously described and the curves of FIG. 7, of course, are not applicable to this condition.)

Thus, internally generated expansion by the mass 34 when the pressure plate 46 is removed is sufficient to increase substantially resistance to the flow of current, perhaps through the breakage of some microwelds or for other presently unknown reasons, but not sufficiently enough without vibration to cause complete switching action. Repeated experiments performed in the manner just described showed no significant variation in results, namely the results of the first experiment were duplicated within limits that indicate the voltage drop across the mass 34 maintains a constant ratio between loaded and unloaded conditions.

In the interrupting device 48, the mass 50 operates to provide resistance as a function of applied pressure and it is in serial relation to the contacts 56 and 58 so as to be in the main current carrying path at all times. Because the mass 50 is substantially conductive when compressed, it dissipates little or no power during closed circuit conditions. In addition, the mass 50 acts as a mechanical damping member thereby providing substantial resiliency for reducing contact bounce upon closing movement. Further, with use of the device 48, there is no need for auxiliary switching of damping resistance in and out of the main current path during circuit opening and closing operations.

In other applications, it has been determined that a mass 60 of fibers 11 (FIG. 8) can be activated to a conductive state by means other than pressure applied physically by an external element. Thus, if the fibrous mass 60 is placed electrically in parallel with a pair of separated contacts 62 forming a part of a circuit interrupter (not shown) and if a voltage is impressed across the contacts, the mass 60 becomes fully conductive when the contacts 62 are closed. In effect, the shorting of the mass 60 results in its becoming conductive. Power current then proceeds through both the mass 60 and the contacts 62. When the contacts 62 are subsequently separated, current flows through the mass 60 to suppress any arcing between the separating contacts 62. Externally induced vibration of the mass 60 then results in full circuit interruption in a manner similar to that described in connection with the switching device 32.

In the foregoing description, several physical arrangements have been described to point out the principles of the invention. Accordingly, the description has been presented only for illustrative purposes, and it is desired that it be not limited to the specific embodiments described here but rather that it be interpreted consistently with the spirit and scope of its broad principles.

What is claimed is:

1. An arrangement for switching an electric circuit, said arrangement comprising a plurality of conductive elements enmassed together, each of said conductive elements having an oxidized surface layer, terminal means disposed on a surface area of the mass of said conductive elements, another terminal means disposed on another mass surface area spaced from the first mentioned mass surface area, each of said terminal means being in contact with at least some of said conductive elements, said conductive element oxidized surface layers normally producing a dielectric barrier against current flow through the mass, each of said conductive elements having sufficient shortness and sufficiently small thickness to assure the absence of a short circuit path between said terminal means and through any single conductive element in the mass, means for activating the mass of said conductive elements into a conductive state so as to form a conductive path between said terminal means, and means for applying distributed force throughout the mass of said conductive elements so as to return the mass to a nonconductive state.

2. An arrangement for switching an electric circuit, said arrangement comprising a plurality of metallic elements enmassed together, each of said metallic elements having an oxidized surface layer, terminal means disposed on a surface area of the mass of said metallic elements, another terminal means disposed on another mass surface area spaced from the first mentioned mass surface area, each of said terminal means being in contact with at least some of said metallic elements, said metallic element oxidized surface layers normally producing a dielectric barrier against current flow through the mass, each of said metallic elements having sufficient shortness and sufficiently small thickness to assure the absence of a short circuit path between said terminal means and through any single metallic element in the mass, means for compressing at least the mass portion of said metallic elements between the mass surface areas so as to switch the mass into a conductive state and form a conductive path between said terminal means, each of said elements formed from a metallic material having sufficient resiliency and hardness normally to withstand operational compressive forces without setting deformation, and means for applying distributed force throughout the mass of said metallic elements so as to return the mass to a nonconductive state.

3. An arrangement for switching an electric circuit, said arrangement comprising a plurality of metallic elements enmassed together, each of said metallic elements having an oxidized surface layer, terminal means disposed on a surface area of the mass of said metallic elements, another terminal means disposed on another mass surface area spaced from the first mentioned mass surface area, each of said terminal means being in contact with at least some of said metallic elements, said metallic element oxidized surface layers normally producing a dielectric barrier against current flow through the mass, each of said metallic elements having sufficient shortness and sufficiently small thickness to assure the absence of a short circuit path between said terminal means and through any single metallic element in the mass, a pressure member disposed on the mass of said metallic elements so as to compress at least the mass portion between the mass surface areas and thereby form a conductive path between said terminal means, each of said metallic elements formed from a material having sufficient resiliency and hardness normally to withstand operational compressive forces without setting deformation, and means for applying distributed force throughout the mass of said metallic elements so as to reutrn the mass to a nonconductive state.

4. An arrangement for switching an electric circuit, said arrangement comprising a plurality of metallic elements enmassed together, said metallic elements formed from a metallic material selected from the group consisting of aluminum, copper, Nichrome, nickel, stainless steel and tungsten, each of said metallic elements having an oxidized surface layer, terminal means disposed on a surface area of the mass of said metallic elements, another terminal means disposed on another mass surface area spaced from the first mentioned mass surface area, each of said terminal means being in contact with at least some of said metallic elements, said metallic element oxidized surface layers normally producing a dielectric barrier against current flow through the mass, each of said metallic elements having sufficient shortness and sufficiently small thickness to assure the absence of a short circuit path between said terminal means and through any single metallic element in the mass, means for compressing at least the mass portion of said metallic elements between the mass surface areas so as to switch the mass into a conductive state and form a conductive path between said terminal means, and means for applying distributed force throughout the mass of said metallic elements so as to return the mass to a nonconductive state.

5. An arrangement for switching an electric circuit, said arrangement comprising a plurality of fibrous metallic elements enmassed together, each of said fibrous elements having an oxidized surface layer, terminal means disposed on a surface area of the mass of said fibrous elements, another terminal means disposed on another mass surface area spaced from the first mentioned mass surface area, each of said terminal means being in contact with at least some of said fibrous elements, said fibrous element oxidized surface layers normally producing a dielectric barrier against current flow through the mass, each of aid fibrous elements having sufficient shortness and sufficiently small thickness to asure the absence of a short circuit path between said terminal means and through any single fibrous element in the mass, means for compressing at least the mass portion of said fibrous elements between the mass surface areas so as to switch the mass into a conductive state and to form a conductive path between said terminal means, each of said fibrous elements formed from a metallic material having sufficient resiliency and hardness normally to withstand operational compressive forces without setting deformation, and means for applying distributed force throughout the mass of said fibrous elements so as to return the mass to a nonconductive state.

References Cited by the Examiner

UNITED STATES PATENTS

| | | | |
|---|---|---|---|
| 362,859 | 5/87 | Stearns | 338—99 |
| 608,685 | 8/98 | Kelly | 338—21 |
| 757,802 | 4/04 | Woodward et al. | 338—99 |
| 910,743 | 1/09 | Thomson | 338—100 |
| 1,705,539 | 3/29 | Ruben | 338—99 |
| 1,877,482 | 9/32 | Ruben | 338—99 |
| 2,273,704 | 2/42 | Grisdale | 252—504 |
| 2,375,178 | 5/45 | Ruben | 338—99 |
| 2,794,885 | 6/57 | Jennings | 200—166 |
| 2,796,505 | 6/57 | Bocciarelli | 338—20 |
| 2,866,047 | 12/58 | Stuellen et al. | 200—48 |

RICHARD M. WOOD, *Primary Examiner.*

BERNARD A. GILHEANY, *Examiner.*